E. I. DODDS.
METHOD OF AND APPARATUS FOR TESTING CASTINGS.
APPLICATION FILED APR. 2, 1910.
1,096,229.
Patented May 12, 1914.
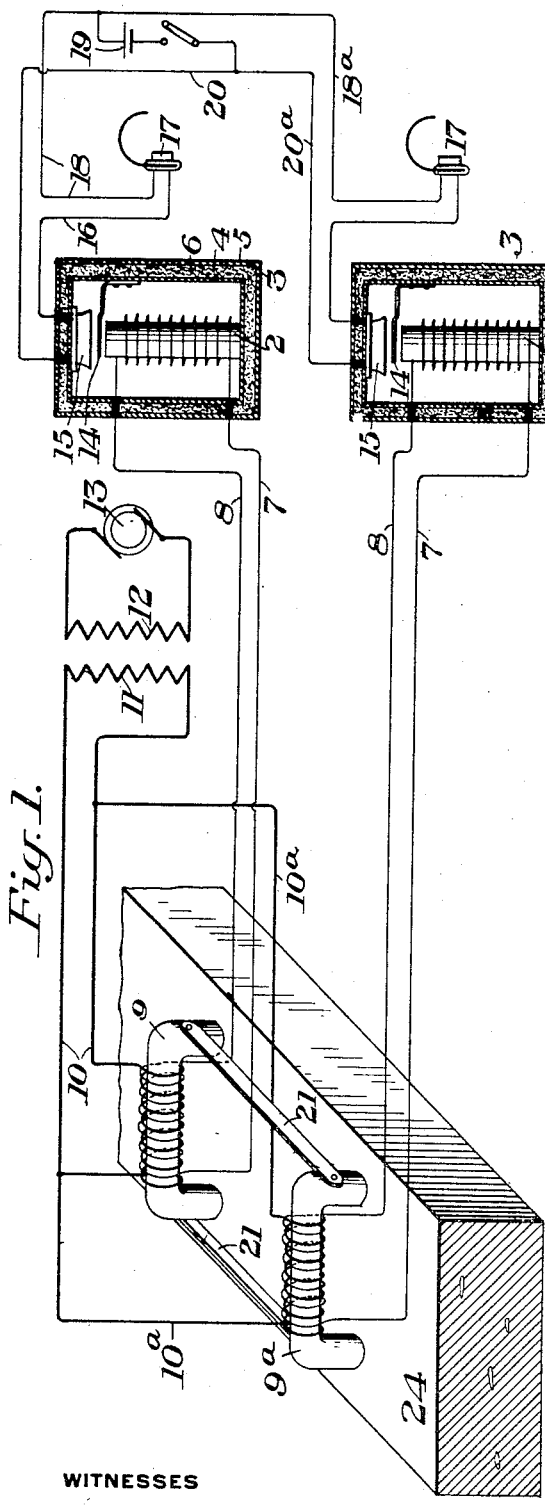
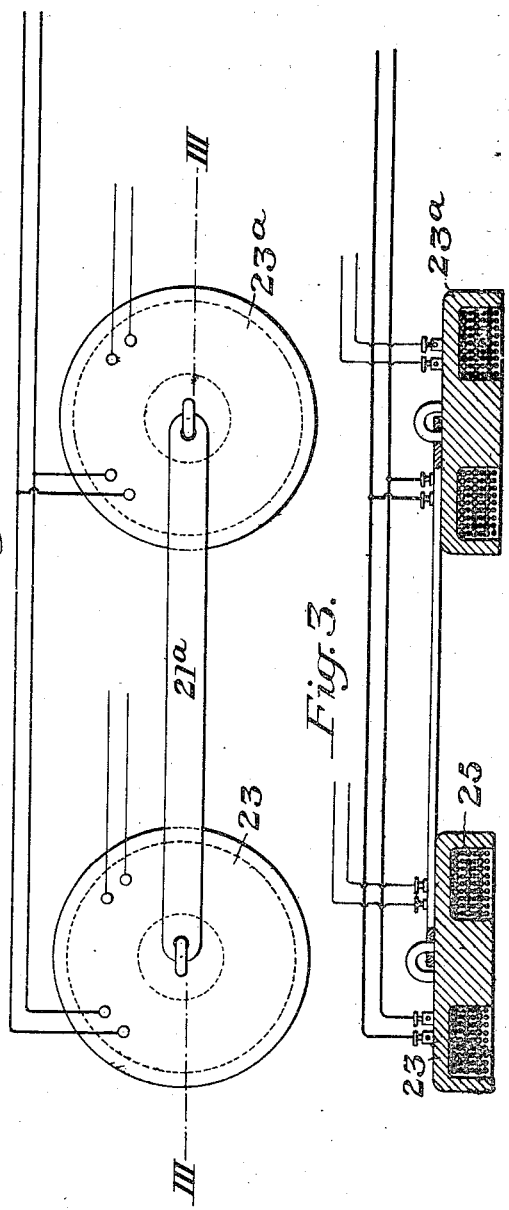
WITNESSES
INVENTOR
E. I. Dodds

UNITED STATES PATENT OFFICE.

ETHAN I. DODDS, OF CENTRAL VALLEY, NEW YORK.

METHOD OF AND APPARATUS FOR TESTING CASTINGS.

1,096,229.  Specification of Letters Patent.  Patented May 12, 1914.

Application filed April 2, 1910. Serial No. 552,956.

*To all whom it may concern:*

Be it known that I, ETHAN I. DODDS, of Central Valley, Orange county, and the State of New York, have invented a new and useful Improvement in Methods of and Apparatus for Testing Castings, of which the following is a full, clear, and exact description, reference being had to the accompanying drawings, forming part of this specification, in which—

Figure 1 is a diagram illustrating one form of indicating device and the various electrical connections. Fig. 2 is a plan view of my preferred form of testing magnets. Fig. 3 is a sectional view on the line III—III of Fig. 2.

This invention relates to an apparatus for testing castings and is designed to provide a simple and reliable indicating apparatus to be used in conjunction with a testing apparatus for testing castings of iron or steel, or other metal pieces of magnetic character.

My invention is designed to provide method and means of effective and convenient character which can be moved relatively to the casting to be tested and which will indicate any differences which there may be in the density or homogeneity of the metal at different points in the casting.

The nature of my invention will be best understood by reference to the accompanying drawings in which I have illustrated the preferred embodiment thereof, and which will now be described, it being premised, however, that various changes can be made in the details of construction and arrangement of the parts without departing from the spirit and scope of my invention as defined in the appended claims.

In these drawings, the numerals 9 and 9ª designate two testing magnets which are capable of being moved along the surface of the casting 24 which is to be tested. Each of these magnets has a primary winding which is energized from the secondary coil 11 of a transformer which has a primary coil, as indicated at 12, and which is energized by an alternating generator 13, or other suitable source. The two primary windings of the magnets 9 and 9ª are connected in multiple with the secondary winding 11, by means of the circuit connections 10 and 10ª. Each of these magnets 9 and 9ª also has a secondary winding, preferably of higher resistance than the primary winding. Each secondary winding is connected by conductors 7 and 8 with the opposite terminals of the winding of an electro-magnet 2 of a sound producing device. Each of these sound producing devices is shown as inclosed within a casing, which preferably has a double wall 4 and 5, with an interposed filling 6 of any suitable material which will act as a non-conductor for sound waves. The sound producing devices may be of any well known character. As shown, each of the magnets 2 is provided with an armature 14 which operates in the manner of an electric buzzer. These two buzzer armatures are tuned so that under the action of like currents in the windings of the magnets 2, they will produce sounds of substantially the same character. Adjacent to each buzzer armature is a transmittter 15, similar to an ordinary telephone transmitter. Each of these transmitters is connected to a corresponding receiver 17, which may also be similar to any ordinary telephone receiver. The two receivers are preferably so arranged that they can be worn on the head of the operator, one receiver being placed over each ear.

16 and 18 designate the conductors connecting one of the receivers 17 with its transmitter 15, the other receiver being similarly connected with its transmitter. Both receiver circuits are connected in multiple with a battery 19.

The apparatus is used as follows: The magnets 9 and 9ª, for convenience in handling, and to enable them to be moved in unison over the casting to be tested, are suitably connected together by the bars 21. They are applied to a surface of the casting in the manner shown in Fig. 1 and are moved along such surface. The casting is thus made to form the armature for the magnets; and so long as the metal adjacent to each magnet is of uniform character and density, approximately the same number of magnetic lines of force will pass between the two poles of each magnet. Similar currents will therefore be induced in the secondary winding of each magnet; and sounds of corresponding character will therefore be produced at the two sound-producing instruments. The operator will, therefore, receive the same sounds at each ear. If, however, there is a defect, such as a blow-hole, in the casting adjacent to one of the testing magnets, the magnetic field of that magnet will be weakened to an extent which will cause less current to be induced in the secondary winding of that magnet than is at the same time being induced in the secondary winding of the other magnet. The sound producing instrument which is connected to this weaker secondary winding will therefore produce a sound of different character from the other instrument and this will be at once detected by the operator.

In Fig. 3 I have illustrated a modification of the invention in which the two testing magnets 23 and 23ª are of disk form, the disks consisting each of a piece of magnetic material, and having one face turned out to form a groove 25 to receive the primary and secondary windings. While I prefer to employ two testing magnets arranged and operated in the manner above described, so that the operator judges of the character of the casting being tested by comparing the sounds emitted by the two receivers, but one testing magnet may be employed, this being connected with a single indicating device, the sound of which will change when the magnetic field of the testing magnet is changed and there is a corresponding variation in the induced current in the secondary winding of the testing magnet. It will also be understood that instead of the particular indicating device illustrated any other suitable indicating device may be employed. It will also be understood that the test piece, instead of the magnets may be moved, although ordinarily it is more convenient to move the magnets. Each testing magnet in effect acts as a transformer whose core is formed in part by the metal of the test piece. The efficiency of each such transformer depends upon the character of the metal of this part of the core. The invention provides means for indicating and comparing this efficiency to thereby determine the character of the metal tested.

The advantages of my invention result from the provision of the novel method described as well as from the provision of a testing device of simple and convenient character by which any small defect in casting can be readily determined.

I claim:

1. The herein described method of comparing one portion of a magnetic casting or other magnetic metal piece with another portion thereof, which consists in simultaneously bringing different portions of the same piece into separate magnetic fields and cutting the lines of force of said fields by a relative movement of the piece to be tested and the fields, and comparing the inductive action produced by the different fields, substantially as described.

2. Testing apparatus of the character described, having a testing magnet provided with an energized primary winding, a secondary winding in inductive relation to the primary winding, and a sound producing instrument connected in series with the secondary winding and of a character to be operated by the currents induced in such secondary winding; substantially as described.

3. Testing apparatus of the character described, having a testing magnet provided with an energized primary winding, a secondary winding in inductive relation to the primary winding, a sound producing instrument connected with the secondary winding and of a character to be actuated by the currents induced in such winding, a transmitter adjacent to the sound producing instrument, and a receiver connected with the transmitter, together with energizing means for the receiver and transmitter; substantially as described.

4. Testing apparatus of the character described, comprising two testing magnets having each a similarly energized primary winding, a secondary winding in inductive relation to the primary winding, and sound producing devices, one of which is connected with each of the secondary windings and is adapted to be operated by the current induced therein, the two sound producing devices being tuned to emit sounds of similar character under the same actuating conditions, and being arranged to permit their emitted sounds to be compared one with the other; substantially as described.

5. Testing apparatus of the character described, comprising two testing magnets having a similarly energized primary winding and a secondary winding in inductive relation to the primary winding, and sound producing devices, one of which is connected with each of the secondary windings and is adapted to be operated by the current induced therein, each of the sound producing devices having a transmitter and each transmitter having a receiver connected therewith, together with energizing means for the receivers and transmitters; substantially as described.

6. Testing apparatus of the character described, comprising two connected magnets adapted to be moved in unison over the piece to be tested, each of said magnets having a similarly energized primary winding and a secondary winding in inductive relation to the primary winding, and two similar indicating devices, each of said devices being connected with the secondary winding of the corresponding magnet and of a character to be operated by the currents induced in such secondary winding, the two sound producing devices being tuned to emit sounds of similar character under the same actuating conditions, and being arranged to permit their emitted sounds to be compared one with the other; substantially as described.

7. Testing apparatus of the character described, comprising two magnets adapted to be moved in unison over an object to be tested, said magnets having energized primary windings of similar character, and also having each a secondary winding, two sound producing instruments, each of said instruments being connected with the secondary winding of a corresponding magnet and of a character to be operated by the currents induced in said secondary winding, each of said instruments having a transmitter and each transmitter having a receiver connected therewith, together with means for energizing the transmitter and receiver circuits, said sound producing instruments being tuned to emit sounds of similar character under the same actuating conditions, and being arranged to permit their emitted sounds to be compared one with the other.

8. In testing apparatus of the character described, magnets adapted to simultaneously generate magnetic fields which extend through different portions of the same test piece and arranged for movement relatively of said piece, and two separate indicating devices in comparative relation to each other having energizing circuits which are inductively related to said magnets; substantially as described.

9. In testing apparatus of the character described, magnets adapted to simultaneously generate magnetic fields which extend through different portions of the same test piece and arranged for movement relatively of said piece, and separate indicating devices, each device having an energizing circuit which is inductively related to one of the magnets; substantially as described.

10. In testing apparatus of the character described, magnets adapted to simultaneously generate magnetic fields which extend through different portions of the same test piece and arranged for movement relatively of said piece, and separate indicating devices having each a circuit in inductive relation to one of said magnets and forming means whereby the inductive effects produced by the magnets may be compared; substantially as described.

11. A testing instrument, comprising a pair of separated electro-magnets, each having separated poles, a primary coil surrounding each of said magnets, means for energizing each of said coils, a secondary coil in inductive relation to each primary coil, a second set of electro-magnets, connected each with one of the secondary coils, and indicating devices arranged to be actuated by the second set of magnets to indicate changes in the energization thereof; substantially as described.

12. A testing instrument, comprising a pair of electro-magnets, each having separated poles, and having each a primary coil and a secondary coil in inductive relation to the primary coil, two other electro-magnets inductively connected respectively to the first named magnets, and an indicating device arranged to be operated by each of the secondary magnets, said devices being arranged in comparative relation to each other; substantially as described.

In testimony whereof, I have hereunto set my hand.

ETHAN I. DODDS.

Witnesses:
J. WALLACE BUSH,
ADA B. GRAHLFS.